United States Patent
Matsui

(10) Patent No.: US 8,285,043 B2
(45) Date of Patent: Oct. 9, 2012

(54) IMAGE PROCESSING APPARATUS AND IMAGE PROCESSING METHOD

(75) Inventor: Kenji Matsui, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 934 days.

(21) Appl. No.: 12/336,632

(22) Filed: Dec. 17, 2008

(65) Prior Publication Data

US 2009/0161952 A1    Jun. 25, 2009

(30) Foreign Application Priority Data

Dec. 20, 2007   (JP) ................................ 2007-329351

(51) Int. Cl.
*G06K 9/00* (2006.01)
(52) U.S. Cl. ........................................................ 382/171
(58) Field of Classification Search ........................ None
See application file for complete search history.

(56) References Cited

U.S. PATENT DOCUMENTS

| | | | | |
|---|---|---|---|---|
| 5,260,804 A * | 11/1993 | Fukutomi et al. | ............. | 358/444 |
| 5,510,908 A * | 4/1996 | Watanabe et al. | ............. | 358/448 |
| 5,677,776 A * | 10/1997 | Matsuda et al. | ............. | 358/475 |
| 5,751,854 A * | 5/1998 | Saitoh et al. | ................... | 382/218 |
| 6,005,683 A * | 12/1999 | Son et al. | ...................... | 358/488 |
| 6,271,935 B1 * | 8/2001 | Cook | ............................ | 358/1.9 |
| 6,272,248 B1 * | 8/2001 | Saitoh et al. | ................... | 382/218 |
| 6,504,628 B1 * | 1/2003 | Kanno et al. | ................... | 358/522 |
| 6,628,833 B1 * | 9/2003 | Horie | ............................ | 382/173 |
| 6,735,341 B1 * | 5/2004 | Horie et al. | ................... | 382/239 |
| 7,006,708 B1 * | 2/2006 | Nako et al. | ..................... | 382/294 |
| 7,016,536 B1 * | 3/2006 | Ling et al. | ...................... | 382/190 |
| 7,139,441 B2 * | 11/2006 | Aihara | ............................ | 382/298 |
| 7,215,446 B2 * | 5/2007 | Ohkawa | ........................ | 358/452 |
| 7,697,776 B2 * | 4/2010 | Wu et al. | ....................... | 382/254 |
| 2002/0110283 A1 * | 8/2002 | Fan et al. | ...................... | 382/264 |
| 2003/0038984 A1 * | 2/2003 | Ohkawa | ........................ | 358/462 |
| 2005/0219616 A1 * | 10/2005 | Furuta et al. | ................. | 358/1.18 |
| 2005/0226510 A1 | 10/2005 | Eguchi et al. | | |

FOREIGN PATENT DOCUMENTS

| | | |
|---|---|---|
| JP | 6-083959 A | 3/1994 |
| JP | 9-043915 A | 2/1997 |
| JP | 2000-036908 | 2/2000 |
| JP | 2003-060878 A | 2/2003 |
| JP | 2004-096435 | 3/2004 |
| JP | 2005-285010 | 10/2005 |
| JP | 2007-189577 | 7/2007 |

OTHER PUBLICATIONS

Notification of Reason(s) for Refusal in JP 2007-329351 dated Jun. 2, 2009, and an English Translation thereof.

* cited by examiner

*Primary Examiner* — Samir Ahmed

(74) *Attorney, Agent, or Firm* — Buchanan Ingersoll & Rooney PC

(57) ABSTRACT

The image processing apparatus is provided with a scanner unit that reads a document and generates image data; an edge vicinity pixel detection unit that detects pixels in the vicinity of the edge of the document based on luminance values of the image data generated by the scanner unit; a histogram creation unit that creates a histogram using the luminance values of pixels in a region of the document within a predetermined distance from the pixels in the vicinity of the edge; and a judgment unit that judges whether or not it is possible to separate a document region from a document-external region based on the created histogram.

18 Claims, 13 Drawing Sheets

RECTANGULAR
ELIMINATION METHOD

ANGULAR
ELIMINATION METHOD

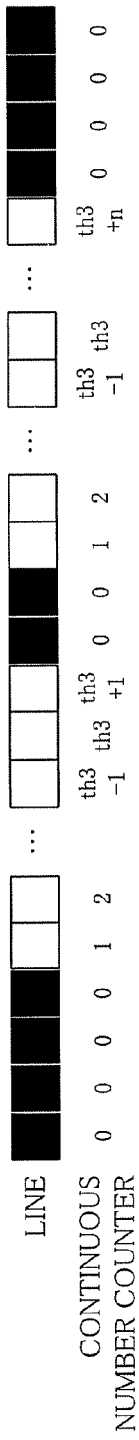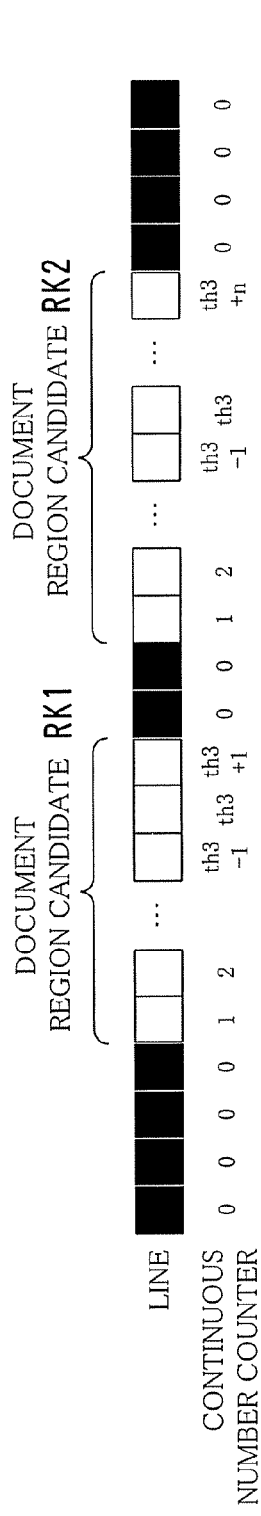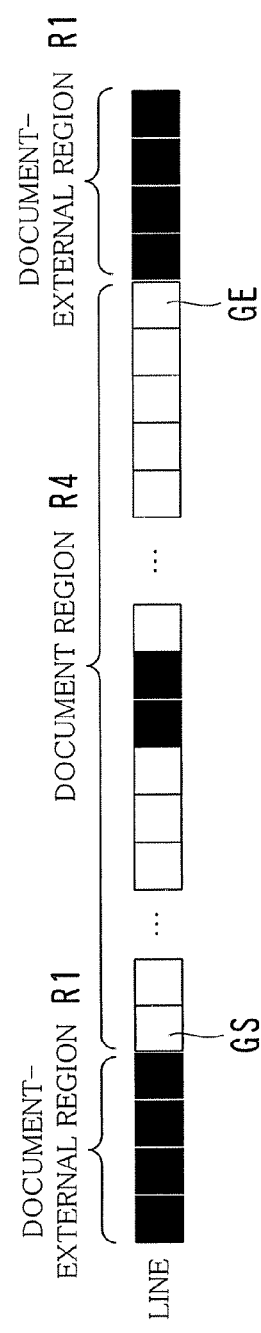

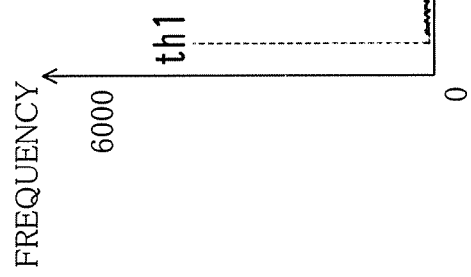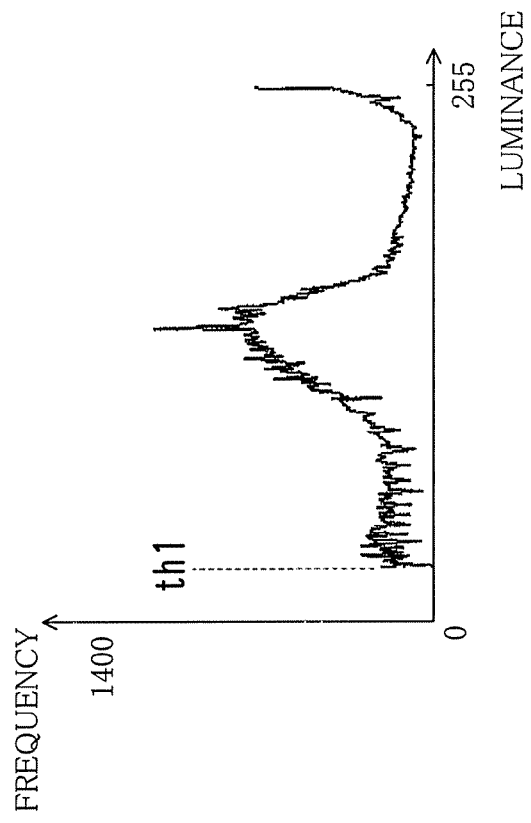

PRIOR ART

IMAGE PROCESSING APPARATUS AND IMAGE PROCESSING METHOD

This application is based on Japanese patent application No. 2007-329351 filed on Dec. 20, 2007, the contents of which are hereby incorporated by reference.

BACKGROUND OF THE INVENTION

1. Field of the Invention

The present invention relates to an image processing apparatus and an image processing method used in an image forming apparatus such as an MFP.

2. Description of the Related Art

Image forming apparatuses that form images using the electrophotographic method, such as, for example, photocopiers, printers, facsimiles, and apparatuses with multiple functions (called MFPs or multi-function peripherals), have conventionally been used to copy documents and the like. When an MFP is used to copy a document while the document lid is open, regions outside of the document normally appear black in the copy.

In response to this, a method that prevents the outside regions from appearing black by eliminating the outside regions, or in other words, by replacing those regions with white color data, has been proposed (see Patent Document 1: JP 2003-60878A). This method detects the position of the ends of the document and replaces the regions on the outer side of the detected end positions with white color data. The image processing apparatus according to Patent Document 1 also includes functionality for detecting a peak value in a histogram of luminance data and taking that peak as the base level (ground level) of the document, and automatically selecting a method for eliminating the regions outside of the document (from among an angular elimination method and a rectangular elimination method, both of which shall be described later) based on a comparison between the base level of the document and a threshold.

Another method has been proposed, in which an inputted image is divided into a plurality of regions based on density (darkness), while reducing the influence of noise, by setting a threshold only for pixels on the edges of the inputted image (see Patent Document 2: JP H06-83959A). Here, a threshold adapted for region division is set so that there is a higher chance that points indicating the borders of regions will be present in the edges.

The number of border points for the regions can be found based on the difference between a cumulative histogram of the inputted image (that is, a histogram in which a darkness and the total pixels having a darkness that is greater than the darkness value of that darkness are associated with one another, for each darkness) and a cumulative histogram of the image after a minimum filtering process has been executed thereon. In other words, cumulative histograms of the input image found in the edges and the input image on which a minimum filtering process has been executed are created, and the number of border points in the edges is found based on the difference between the cumulative histograms. A proper region division is thus implemented by setting a threshold that increases the chance that border points will be present in the edges.

However, when a histogram created based on the entire scanned image is used, as is the case with the method in Patent Document 1, the darkness data outside of the regions surrounding the document results in noise. While this does not present a problem in a text document, where there is only a single base level and the content is clear and pronounced, there are many cases where erroneous determination occurs when selecting the elimination method for the regions outside the edges of a document that, for example, includes many photographs, which results in the selection of an inappropriate elimination method. In other words, erroneous determination occurs, in which the rectangular elimination method is selected despite the fact that the angular elimination method should have been selected or vice versa.

Furthermore, because the pixels in the edges include the darkness values near the threshold (and including the threshold itself), it is difficult, with the method according to Patent Document 2, to select an appropriate elimination method by dividing the document into document regions and non-document regions based on the threshold, or in other words, by accurately detecting the edge of the document.

The following can be given as another method for selecting an elimination method. A histogram is created for an overall image based on image data scanned and generated by a scanning unit (in other words, a scanned image) while the document lid is open, such as that shown in FIG. 12A; the base luminance value of the document is compared with a predetermined threshold in the created histogram, as illustrated in FIG. 13A. The base luminance value can be found using a conventionally proposed and publicly-known method. In this case, the base luminance value is greater than the threshold, and thus the angular elimination method is selected as the elimination method. Referring to FIG. 12A, the left part of an object, which corresponds to a region RN in FIG. 11, appears to be missing. This is because the luminance value in the left part of the object is extremely low.

Meanwhile, a histogram is created for an overall image based on image data scanned and generated by a scanning unit (in other words, a scanned image) while the document lid is open, such as that shown in FIG. 12B; the base luminance value of the document is compared with a predetermined threshold in the created histogram, as illustrated in FIG. 13B. In this case, the base luminance value is lower than the threshold, and thus the rectangular elimination method is selected as the elimination method.

However, in the case of the former (FIG. 13A), regions that are not supposed to be eliminated are eliminated, whereas in the case of the latter (FIG. 13B), the rectangular elimination method is selected even though the angular elimination method can be used, and thus regions that are outputted as black (solid black regions) arise needlessly.

SUMMARY

Having been conceived in light of such problems, it is an object of the present invention to appropriately select a method for eliminating regions outside of a document.

According to one aspect of the present invention, an image processing apparatus includes a reader that reads a document and generates image data, an edge vicinity pixel detector that detects pixels in the vicinity of an edge of the document based on luminance values of the image data generated by the reader, a histogram creating portion that creates a histogram using luminance values of pixels in a region of the document within a predetermined distance from the pixels in the vicinity of the edge, and a determination portion that determines whether or not it is possible to separate a document region from a document-external region based on the created histogram.

Preferably, the region may be a region that does not include pixels in an edge that is a border between the document region and the document-external region.

Further, the edge vicinity pixel detector may detect, on a line-by-line basis, regions in which pixels having luminance values greater than or equal to a pre-set threshold continue for greater than or equal to a predetermined number of pixels, may detect, when a single region has been detected, one or more pixels on either side of the single region as the pixels in the vicinity of the edge, and may detect, when plural regions have been detected, one or more pixels, from among pixels included in the plural regions, that are located in outermost positions of the plural regions as the pixels in the vicinity of the edge.

According to the structure described above, an appropriate selection of a method for eliminating regions outside of a document can be made.

BRIEF DESCRIPTION OF THE DRAWINGS

FIGS. 9A, 9B, and 9C are diagrams illustrating a method for determining a document region.

FIGS. 10A and 10B are diagrams illustrating histograms created based on the luminance values in the histogram acquisition ranges of the image data shown in FIGS. 12A and 12B.

DESCRIPTION OF THE PREFERRED EMBODIMENTS

When a copy is made using an image forming apparatus such as an MFP (multi-function peripheral) with the document lid open, regions that are outputted as black (solid black regions) arise in the post-copy recording paper, outside of the edges of the image made based on the document. An image processing apparatus according to the present embodiment has functionality enabling it to appropriately select the method for eliminating the regions outside of the document.

First, the image processing apparatus shall be outlined. In the present embodiment, the image processing apparatus detects positions assumed to be the edges of the document (beginning and end positions of the document) and determines a peripheral region of the document based on those positions. Then, the apparatus creates a histogram indicating a frequency distribution of the luminance data where the creation range is limited to the peripheral region of the document. In other words, the luminance data of pixels at the edges is noise data (luminance data into which noise has entered), which is different than the luminance data within the above-mentioned peripheral regions, and thus such luminance data is excluded from the creation range of the histogram. The method for eliminating the regions outside of the document is appropriately selected based on the created histogram. Note that an inverse relationship is observed between the luminance value and the darkness value.

Figure 1:
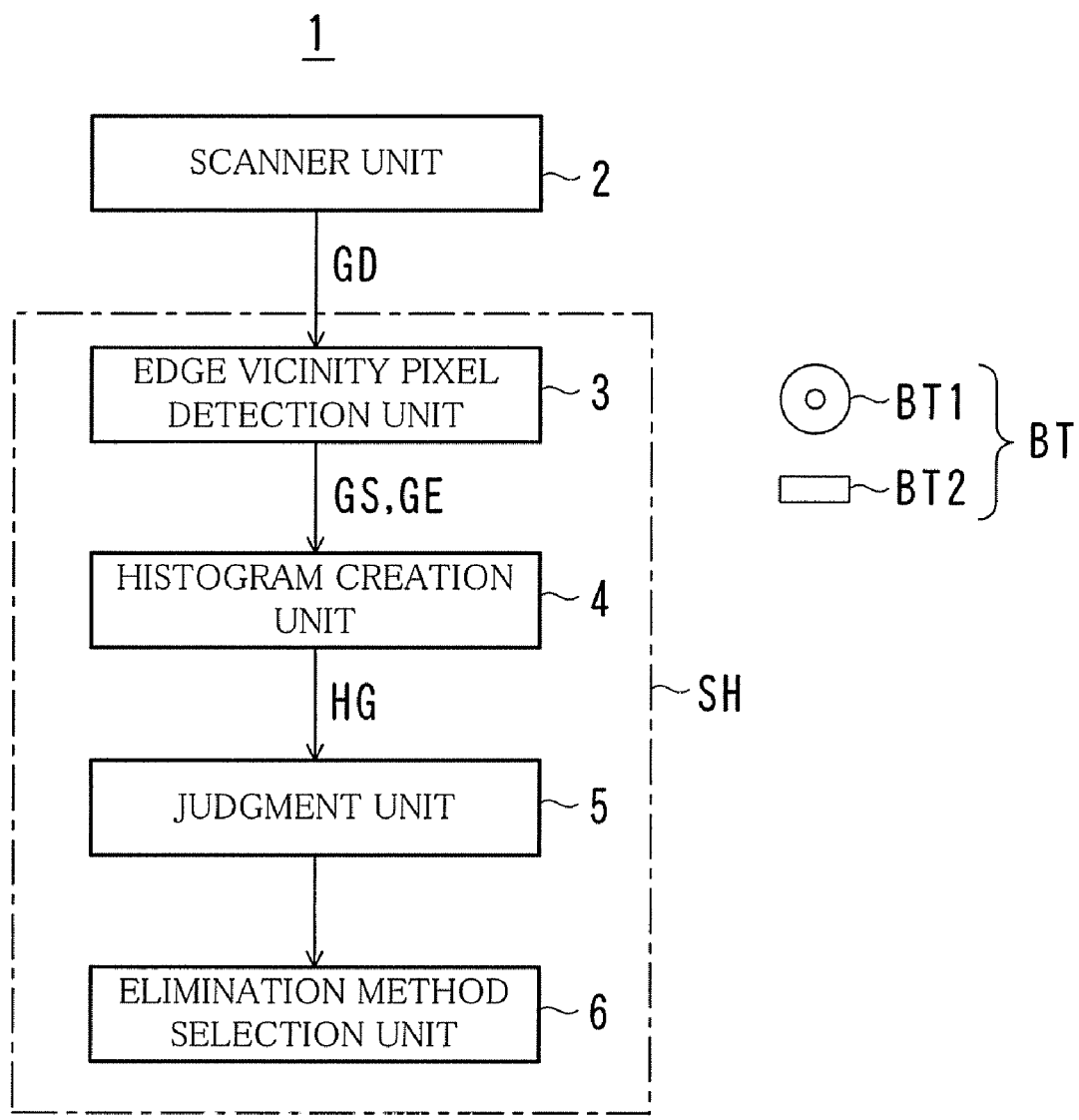
FIG. 1 is a block diagram illustrating a functional configuration of an image processing apparatus according to an embodiment of the present invention.

FIG. 1 is a block diagram illustrating a functional configuration of an image processing apparatus 1 according to an embodiment of the present invention. As illustrated in FIG. 1, the image processing apparatus 1 according to the present embodiment includes a scanner unit 2, an edge vicinity pixel detection unit 3, a histogram creation unit 4, a judgment unit 5, and an elimination method selection unit 6.

The scanner unit 2 scans a document and generates image data GD. The edge vicinity pixel detection unit 3 detects pixels in the vicinity of the edge of the document based on luminance values of the image data GD generated by the scanner unit 2. To be more specific, the edge vicinity pixel detection unit 3 detects a pixel in a start position (a "start pixel GS", mentioned later) and a pixel in an end position (an "end pixel GE", also mentioned later) of the document region in the main scanning direction, for each line.

The histogram creation unit 4 creates a histogram HG for a predetermined region within the document that takes the edge vicinity pixels as a reference point. Specifically, the histogram creation unit 4 creates a histogram HG for a region (a predetermined region) of the document within a predetermined distance from the pixels in the vicinity of the edge detected by the edge vicinity pixel detection unit 3. The judgment unit 5 judges whether or not the document region and the region outside of the document can be separated from one another based on the histogram HG created by the histogram creation unit 4. Finally, the elimination method selection unit 6 selects the appropriate elimination method from among the angular elimination method and the rectangular elimination method based on the results of the judgment performed by the judgment unit 5.

The edge vicinity pixel detection unit 3, the histogram creation unit 4, the judgment unit 5, and the elimination method selection unit 6 are functionally implemented by a processing unit SH, which is made up of a CPU, a ROM, a RAM, and other such related elements. The CPU and the like may be entirely or partially integrated as an IC and used appropriately, as, for example, a microprocessor, an ASIC (Application-Specific Integrated Circuit), or the like.

A computer program for implementing the respective functions of the edge vicinity pixel detection unit 3, the histogram creation unit 4, the judgment unit 5, and the elimination method selection unit 6 is loaded in the processing unit SH. This type of program can be installed from a portable recording medium BT, which includes a recording medium BT1, such as a CD-ROM, DVD-ROM, or the like, or a recording medium BT2, such as a semiconductor memory or the like, the recording medium having the program recorded therein. The program may also be downloaded from a server via a network.

Next, a procedure for creating the histogram HG shall be described with reference to the drawings. Although the following describes a case where the luminance data of the image is used when creating the histogram HG, it should be noted that the histogram HG may also be created using darkness data.

Figure 2:
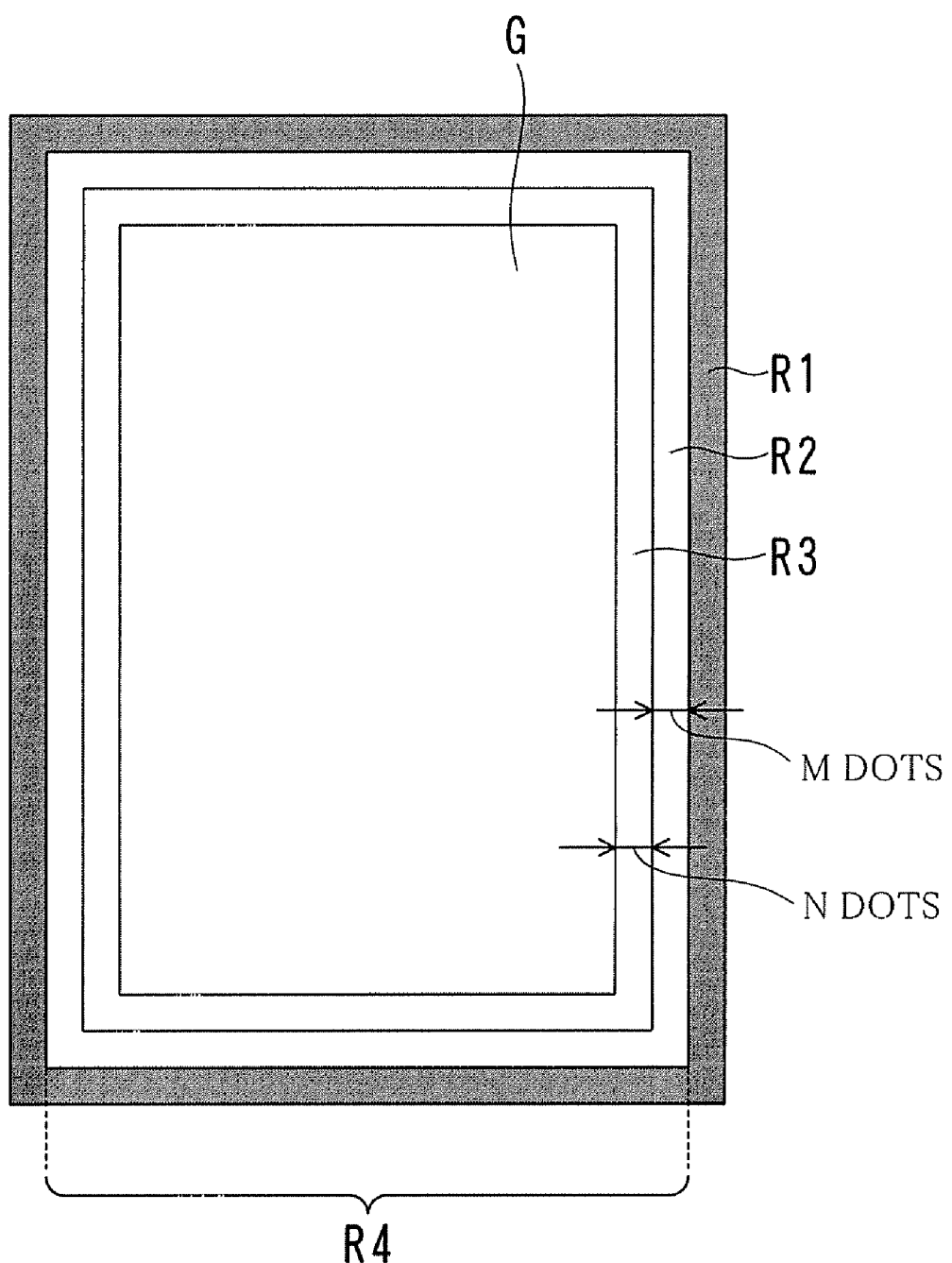
FIG. 2 is a diagram illustrating an example of a range for acquisition of luminance data for creating a histogram (a histogram acquisition range).
Figure 3:
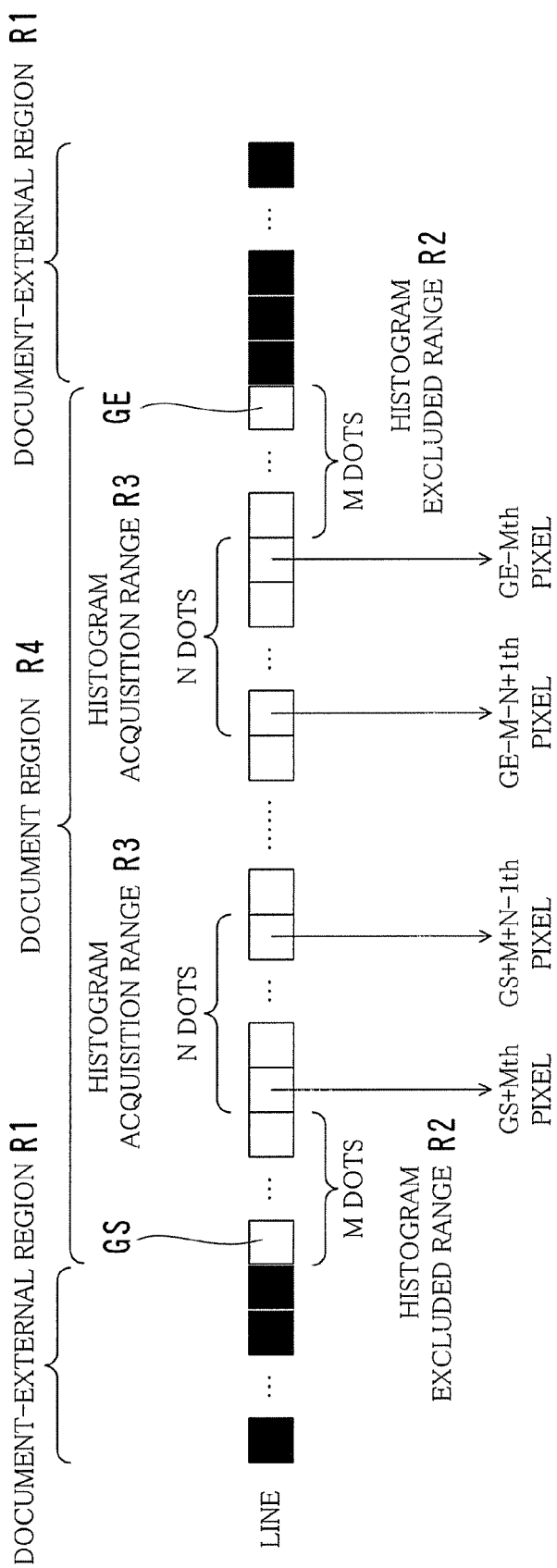
FIG. 3 is a diagram illustrating the histogram acquisition ranges for a particular line.
Figure 4A:
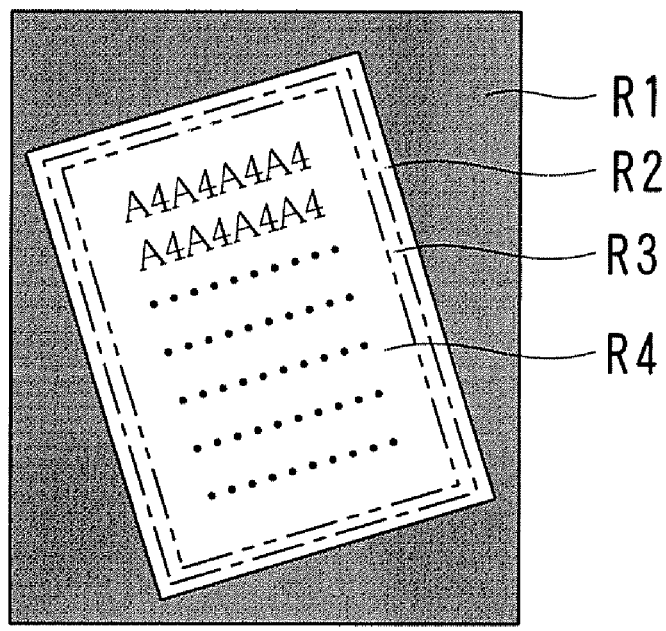
FIGS. 4A and 4B are conceptual diagrams illustrating histogram acquisition ranges in documents.
Figure 4B:
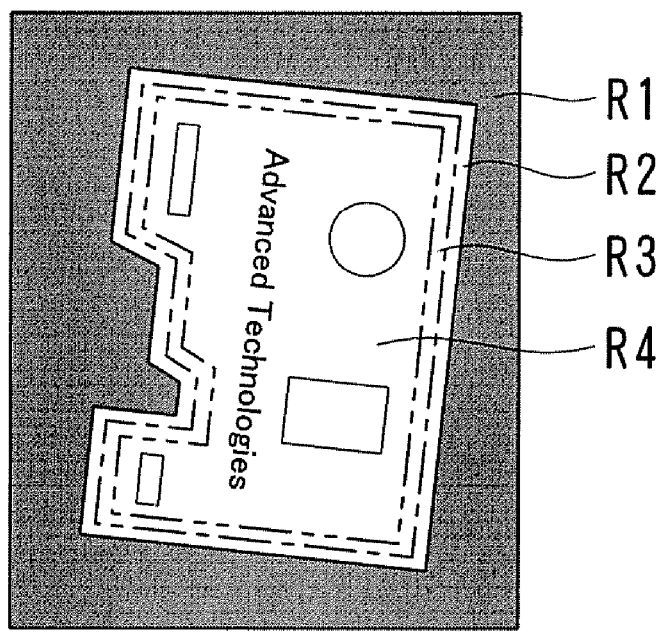
Figure 5:
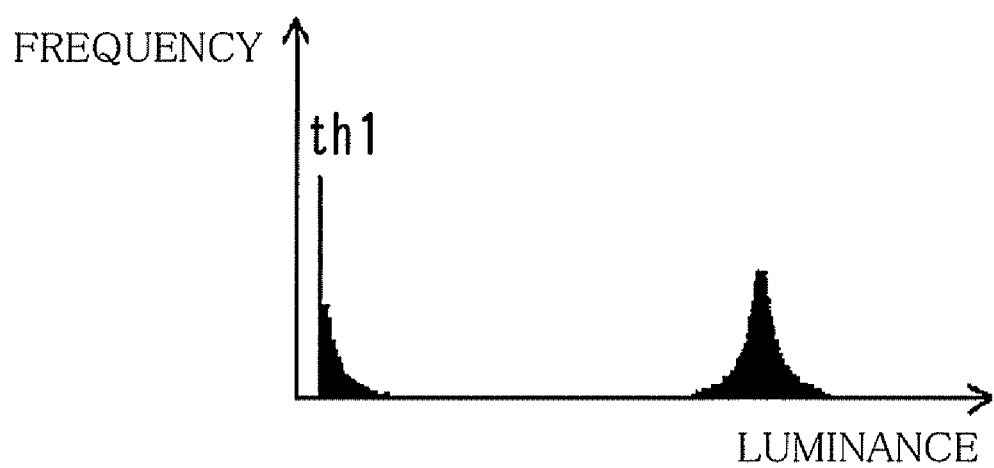
FIG. 5 is a conceptual diagram of a histogram created based on the luminance data in histogram excluded ranges and in histogram acquisition ranges of the document region in FIG. 4A.

FIG. 2 is a diagram illustrating an example of acquired ranges of luminance data for creating the histogram HG (in other words, histogram acquisition range); FIG. 3 is a diagram illustrating histogram acquisition ranges for a particular line; FIGS. 4A and 4B are conceptual diagrams illustrating the histogram acquisition ranges for a document G; and FIG. 5 is a conceptual diagram of the histogram HG based on the luminance data in the document region shown in FIG. 4A. More specifically, as described later, FIG. 5 is a conceptual diagram of the histogram HG based on the luminance data in histogram excluded ranges R2 and in histogram acquisition ranges R3 shown in FIG. 4A First, images, characters, and the like in the document G are read by the scanner unit 2 (image reading portion), which is configured of a reading unit made up of a CCD (charge-coupled device), a mirror, glass, and so on; and luminance data is generated as a result.

As indicated in FIG. 3, a document region R4, which is the region of the document G, is determined per line in the main scanning direction, based on the luminance data generated by the scanner unit 2. By the same token, document-external regions R1, which are regions to the outside of the document region R4, are determined as well.

Here, a histogram is acquired, in advance, for the exterior light arising in a state where paper on which the document G has been written has not been mounted on the reading unit. In the present embodiment, a luminance value having the highest frequency detected in the pre-acquired histogram is taken as a threshold th1, used to separate the document region R4 from the document-external regions R1. If the luminance value of a certain pixel is below the threshold th1, that pixel is determined to be present in the document-external regions R1, whereas if the luminance value of a certain pixel is greater than or equal to the threshold th1, that pixel is determined to be present in the document region R4.

In FIG. 3, pixels determined based on the threshold th1 to be present in the document-external regions R1 are illustrated as black, whereas pixels determined to be present in the document region R4 are illustrated as white. The pixel at one end of the document region R4 (in FIG. 3, the left end) is taken as the pixel GS in the start position of the document region R4 (called the "start pixel" hereinafter), and the pixel at the other end of the document region R4 (in FIG. 3, the right end) is taken as the pixel GE in the end position of the document region R4 (called the "end pixel" hereinafter).

Next, the range in the line spanning M dots (M pixels) from the start pixel GS toward the direction of the document region R4 (toward the right side), and the range in the line spanning M dots from the end pixel GE toward the direction of the document region R4 (toward the left side), are taken as the histogram excluded ranges R2, which are ranges that are not to be used in the creation of the histogram HG.

Pixels present in the histogram excluded ranges R2 are pixels in the edges of the document G. Luminance data of pixels in the edges is considered to be noise data, and is thus excluded from the creation of the histogram HG. In the present embodiment, "M dots" is set to be, for example, 1 dot or 2 dots. For example, in the case where "M dots" refers to 1 dot, the pixels present in the histogram excluded ranges R2 are the start pixel GS and the end pixel GE. Note that the histogram excluded ranges R2 and the histogram acquisition ranges R3 are regions within the document region R4.

Furthermore, in the present embodiment, a range spanning N dots from the (GS+M)th pixel toward the direction of the document region R4, and a range spanning N dots from the (GE−M)th pixel toward the direction of the document region R4, are taken as histogram acquisition ranges R3, which are ranges that are to be used in the creation of the histogram HG.

To be more specific, the ranges corresponding to the histogram acquisition ranges R3 are as follows: the range spanning from the (GS+M)th pixel to the (GS+M+N−1)th pixel, toward the direction of the document region R4; and the range spanning from the (GE−M)th pixel to the (GE−M−N+1)th pixel, toward the direction of the document region R4.

When the process illustrated in FIG. 3 is carried out on all lines, a document-external region R1, histogram excluded range R2, histogram acquisition range R3, and document region R4 of the overall document can be obtained, as illustrated in FIG. 2.

Exemplary conceptual illustrations of the document-external region R1, histogram excluded range R2, histogram acquisition range R3, and document region R4 are shown in FIGS. 4A and 4B.

A conceptual illustration of a histogram HG0, created based on the luminance data of the histogram excluded ranges R2 and the histogram acquisition ranges R3 in the document region in FIG. 4A, is shown in FIG. 5. In the histogram HG0 shown in FIG. 5, the portion that protrudes on the left side has its basis in the luminance values of the pixels on the edge of the document G, or in other words, the pixels present in the histogram excluded range R2. Meanwhile, the portion that protrudes on the right side has its basis on the luminance values of the pixels present in the histogram acquisition range R3.

Accordingly, if the range of creation for the histogram HG0 includes the abovementioned histogram excluded range R2, luminance data of the pixels in the edge, which is noise data, will be present in the histogram HG0. As a result, it is difficult to appropriately separate the document region R4 and the document-external region R1 from one another. Accordingly, the range of creation for the histogram HG is limited to the histogram acquisition range R3.

Figure 6:
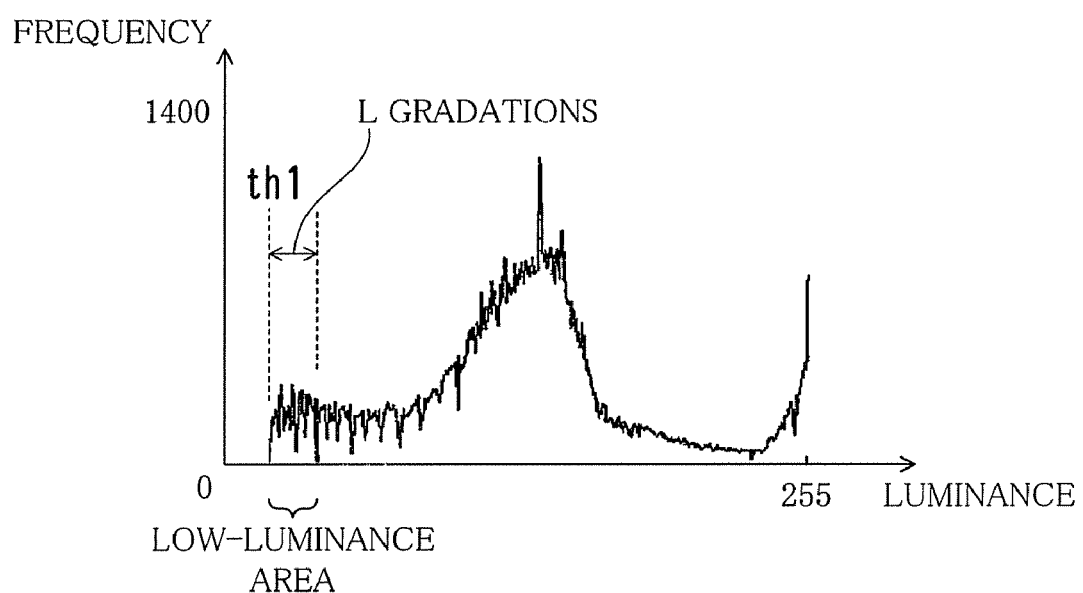
FIG. 6 is a diagram illustrating an example of a histogram of luminance data acquired from the histogram acquisition range shown in FIG. 4B.

FIG. 6 is a diagram illustrating an example of a histogram HG of luminance data acquired from the histogram acquisition range R3 shown in FIG. 4B.

As illustrated in FIG. 6, the proportion of the frequency of low-luminance data to the overall frequency of the luminance data in the histogram HG of the histogram acquisition range R3 is calculated. "Low-luminance data" refers to luminance data present in a range that spans across L gradations from the previously mentioned threshold th1. In the present embodiment, L gradations are taken as, for example, 5 gradations. The appropriate method for eliminating the document-external region R1 can be selected based on the results of calculating the proportion of the frequency of the low-luminance data with respect to the overall frequency of the luminance data.

Next, the series of processes discussed above shall be described with reference to a flowchart.

Figure 7:
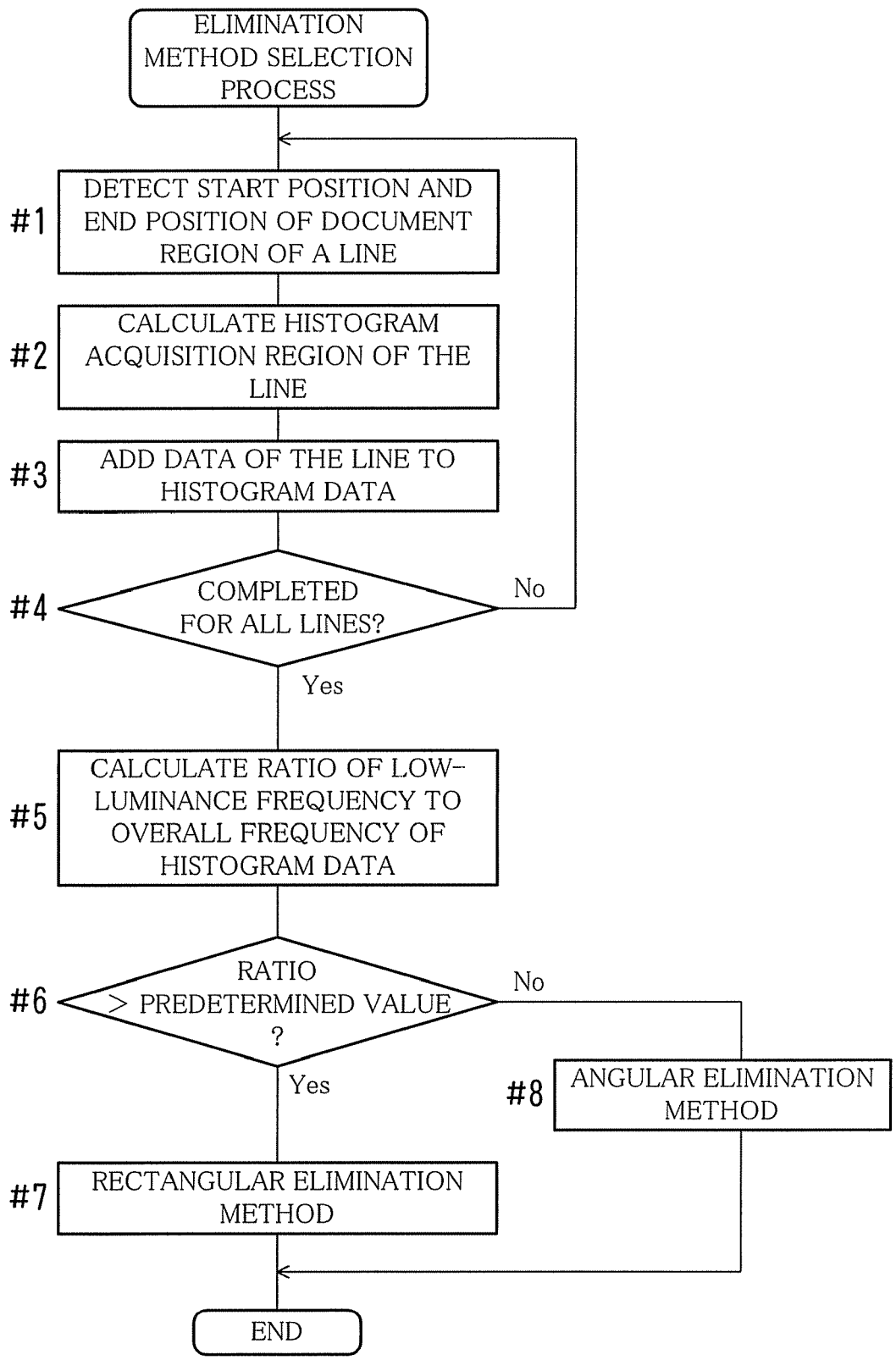
FIG. 7 is a flowchart illustrating an elimination method selection process for eliminating a document-external region.

FIG. 7 is a flowchart illustrating an elimination method selection process for eliminating the document-external region R1. As indicated in FIG. 7, first, the start pixel GS and the end pixel GE of the document region R4 for a particular line are detected by comparing the luminance values of the pixels within that line with the threshold th1 (#1).

The histogram acquisition ranges R3 for that particular line are then calculated by excluding the histogram excluded ranges R2 from the document region R4 (#2). After this, the luminance data in the histogram acquisition ranges R3 of the line is added to the histogram HG (#3).

Next, it is judged whether or not the processes in the above steps #1 through #3 have been completed for all lines (#4). If the processes have not been completed for all lines (No in #4), the procedure returns to #1, and the processes from #1 to #3 are repeated.

However, if the processes have been completed for all lines (Yes in #4), the proportion of the frequency of the low-luminance data to the overall frequency of the histogram data from the histogram acquisition ranges R3 is calculated (#5).

It is then judged whether or not the calculated proportion exceeds a predetermined value th2 (#6). If the calculated proportion exceeds the predetermined value th2 (Yes in #6), it is assumed that it will be difficult to separate the document-external region R1 and the document region R4 from one another, and thus the rectangular elimination method is selected (#7), and the process ends.

However, if the calculated proportion is less than or equal to the predetermined value th2 (No in #6), it is assumed that the document-external region R1 and the document region R4 can be separated from one another, and thus the angular elimination method is selected (#8), and the process ends.

Note that whether or not the frequency of the low-luminance data exceeds a predetermined threshold th21 may be judged during the process of the abovementioned #6. If the frequency of the low-luminance data exceeds the threshold th21, there is a comparatively large amount of low-luminance data near the border between the document region R4 and the document-external region R1; it can therefore be seen that the accuracy of detecting the position of the start pixel GS is not high, and thus the rectangular elimination method is selected. However, if the frequency of the low-luminance data is less than or equal to the threshold th21, there is a comparatively small amount of low-luminance data near the border between the document region R4 and the document-external region R1; it can therefore be seen that the accuracy of detecting the position of the start pixel GS is high, and thus the angular elimination method is selected.

Hereinafter, the publicly-known rectangular elimination method and angular elimination method, which serve as methods for eliminating the document-external region R1, shall be explained.

FIG. 8 is a diagram illustrating the rectangular elimination method and the angular elimination method.

Figure 8A:
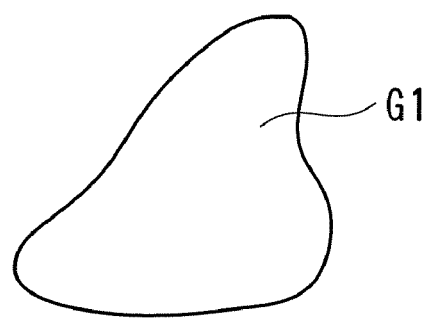
FIGS. 8A, 8B, and 8C are diagrams illustrating a rectangular elimination method and an angular elimination method.
Figure 8B:
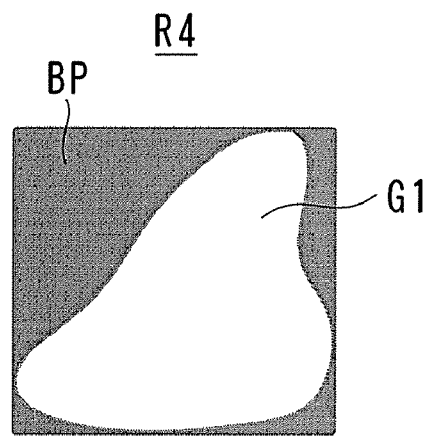

The rectangular elimination method is a method that takes, for example, a document G1 with a shape such as that shown in FIG. 8A, sets the region within the smallest possible rectangle (quadrangle) that surrounds the document G1 as the document region R4, and sets the other regions as the document-external region R1 (not shown in FIG. 8). When the resultant is transferred onto recording paper, a region that is outputted as black (solid black region) BP is present, as illustrated in FIG. 8B.

Figure 8C:
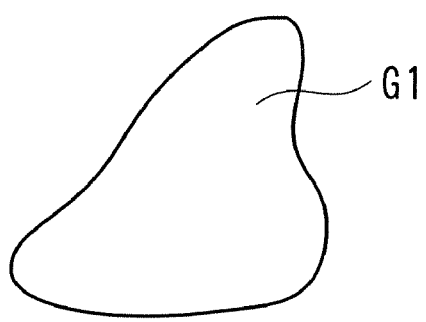

Meanwhile, the angular elimination method is a method that takes, for example, a document G1 with a shape such as that shown in FIG. 8A, sets the shape of the document G1 itself as the document region R4, and sets the other regions as the document-external region R1 (not shown in FIG. 8). When the resultant is transferred onto recording paper, the solid black region BP is not present, as illustrated in FIG. 8C.

FIG. 9 is a diagram illustrating a method for determining the document region R4. According to this method, the document-external region R1 and the document region R4 can be determined appropriately even in the case where pixels with luminance values less than the threshold th1 (e.g. pixels representing characters or the like) are present in the document region R4.

First, the continuous number of pixels having luminance values greater than or equal to the threshold th1 are counted in the main scanning direction in a particular line.

In FIG. 9, pixels with luminance values less than the threshold th1 are indicated by black, whereas pixels with luminance values greater than or equal to the threshold th1 are indicated by white. In FIG. 9A, the pixels for which the continuous number is to be counted are the pixels indicated by white; the value of this counting are, for example, a threshold th3+1 and a threshold th3+n (where n is an arbitrary integer). In the present embodiment, the threshold th3 is, for example, 20.

Next, a region in which the continuous number is greater than or equal to the threshold th3 is taken as a document region candidate. In FIG. 9B, there are two regions in which the continuous number is greater than or equal to the threshold th3; these regions are thus taken as a document region candidate RK1 and a document region candidate RK2, respectively. Note that the black pixels present between the document region candidate RK1 and the document region candidate RK2 are pixels indicating characters or the like.

Next, the outermost two pixels from among the pixels included in the plural (2, in FIG. 9B) document region candidates RK1 and RK2 are determined to be the start pixel GS and the end pixel GE, respectively, as shown in FIG. 9C.

Accordingly, even if pixels indicating characters and the like, which have luminance values of less than the threshold th3, are present in the document region R4, a mistaken determination, in which the region in which those pixels are present is mistakenly determined to be the document-external region R1, can be prevented. It is thus possible to appropriately determine the document-external region R1 and the document region R4.

(Effects of the Present Embodiment)

Effects provided by the present embodiment shall be described with reference to the drawings.

FIG. 10 is a diagram illustrating the histogram HG, which is based on the luminance values found in the histogram acquisition range R3 of image data GD shown in FIG. 12; meanwhile, FIG. 11 is a diagram illustrating the effects of the present embodiment.

Figure 12A:
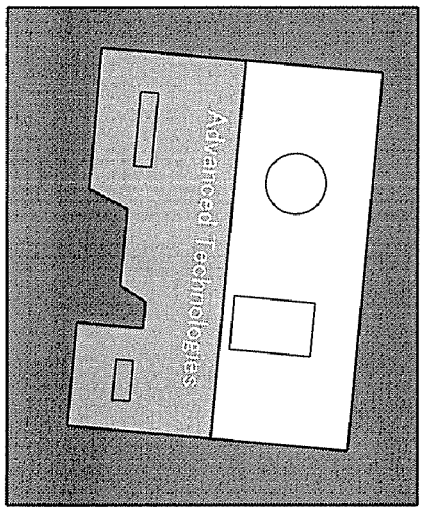
FIGS. 12A and 12B are diagrams illustrating images based on image data scanned and generated by a scanner unit (scanned images) when the document lid is open.

In the scanned image shown in FIG. 12A, the luminance values in the histogram acquisition range R3 are low, and thus the histogram HG thereof is as shown in FIG. 10A. However, in the scanned image shown in FIG. 12B, the luminance values in the histogram acquisition range R3 are high, and thus the histogram HG thereof is as shown in FIG. 10B. Hence, the luminance values of the histogram acquisition ranges R3 are clearly reflected in each of the histograms HG.

Figure 13A:
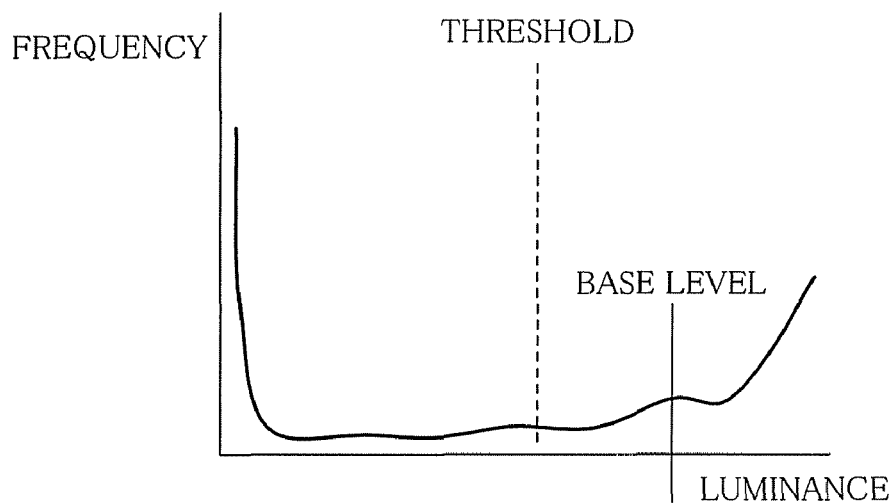
FIGS. 13A and 13B are diagrams illustrating a conventional method for selecting a method for eliminating a document-external region.

As described with reference to the background art and FIG. 13A above, when a histogram HG is created for the entirety of the scanned image in FIG. 12A and the angular elimination method is selected based on a comparison between the base luminance value and the threshold, a region RN that is not supposed to be eliminated is ultimately eliminated, as illustrated in the left diagram in FIG. 11A.

Figure 11A:
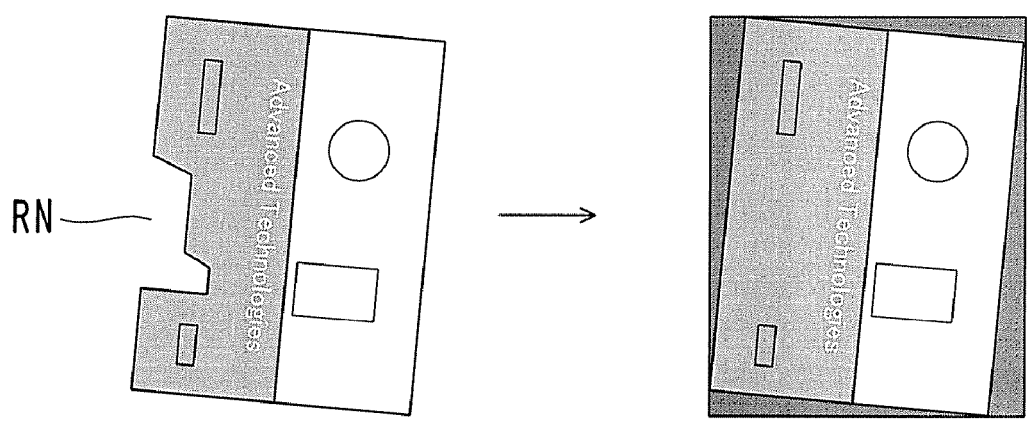
FIGS. 11A and 11B are diagrams illustrating the effects of an embodiment of the present invention.

As opposed to this, according to the image processing apparatus 1 of the present embodiment, the rectangular elimination method is selected as a result of the elimination method selection process (FIG. 7) described above, and thus the region RN that is not supposed to be eliminated is not eliminated, as illustrated in the right diagram in FIG. 11A.

Figure 12B:
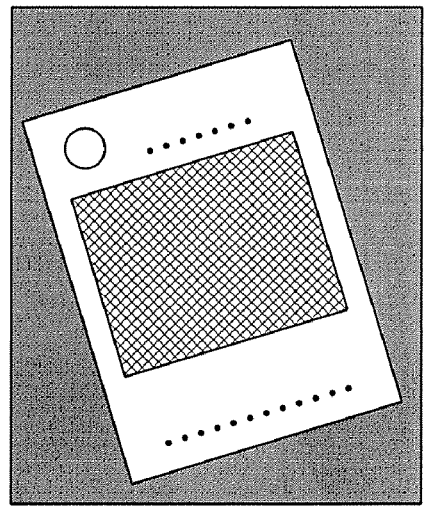
Figure 13B:
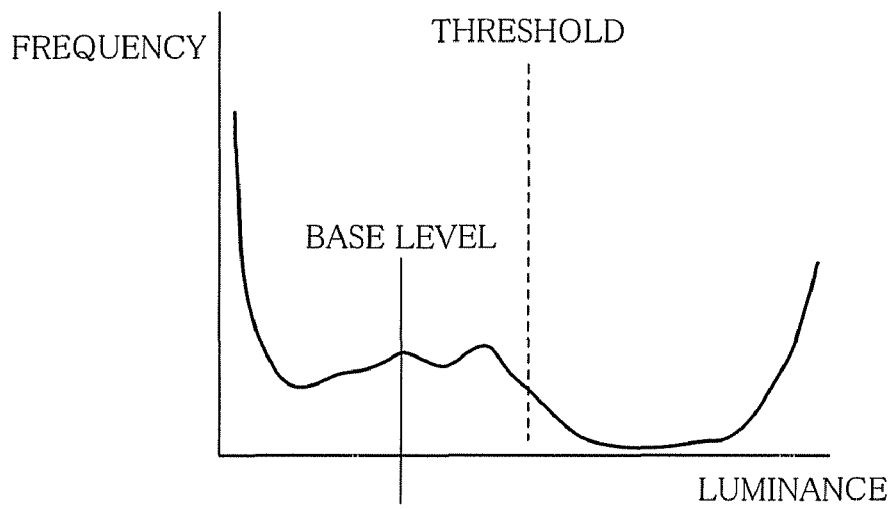

Furthermore, as described with reference to FIG. 13B above, when a histogram is created for the entirety of the scanned image in FIG. 12B and the rectangular elimination method is selected based on a comparison between the base luminance value and the threshold, the rectangular elimination method is selected regardless of the fact that the angular elimination method can be used, and thus a solid black region BP arises needlessly, as shown in the left diagram in FIG. 11B.

Figure 11B:
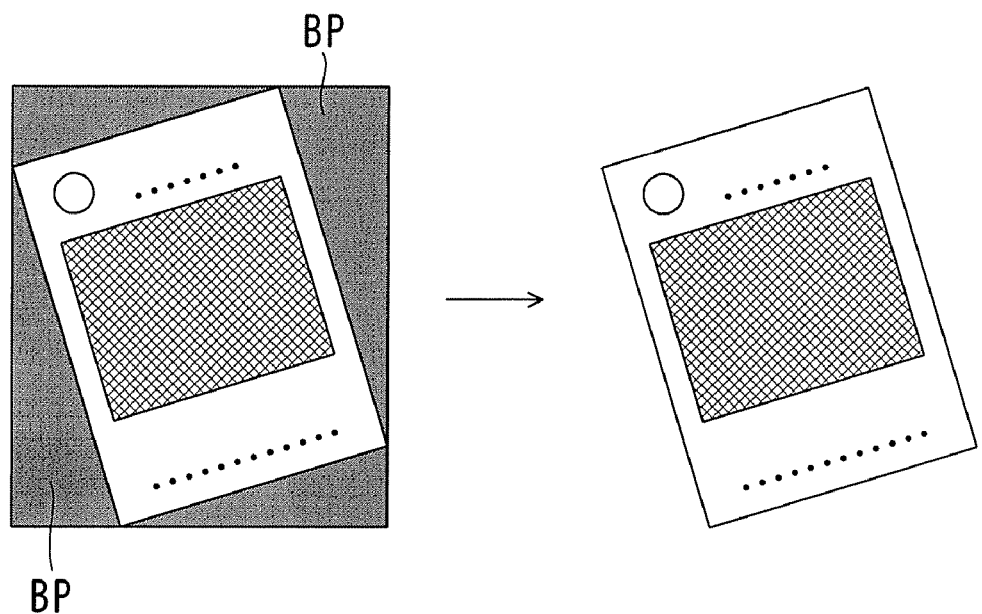

As opposed to this, according to the image processing apparatus 1 of the present embodiment, the angular elimination method is selected as a result of the elimination method selection process (FIG. 7), and thus the document-external region R1 is appropriately eliminated, as illustrated in the right diagram in FIG. 11B.

As described above, in the present embodiment, a histogram HG that is limited to the luminance data of the pixels present in the histogram acquisition range R3 is created, excluding the luminance data of pixels present in the histogram excluded range R2, or in other words, of pixels in the edges of the document G. This makes it possible to exclude luminance data of pixels in edges, which results in noise data, from the histogram HG.

The elimination method is then selected based on the proportion of low-luminance data to the overall frequency of luminance data in the created histogram HG. Therefore, erroneous elimination, selection of the rectangular elimination method even when the angular elimination method can be used, and so on are prevented.

The document-external region R1 can therefore be eliminated using the appropriate elimination method.

(Other Embodiments)

In the abovementioned embodiment, the proportion of the frequency of the low-luminance data to the overall frequency of the luminance data in the histogram HG for the histogram acquisition range R3 is used when selecting one of the rectangular elimination method and the angular elimination method. However, the present invention is not intended to be limited to such a scheme, and the elimination method may be determined based on a comparison between the number of pixels in the low-luminance data and a pre-set first selection threshold, or based on a comparison between the peak luminance value in the histogram HG and a pre-set second selection threshold.

Moreover, the configuration, processing content, processing order, and so on of the image processing apparatus 1 in its entirety or the various constituent elements included therein may be altered as appropriate within the spirit of the present invention. The abovementioned unique and distinguished effects can be attained in such a case as well.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus, comprising:
   a reader that reads a document and generates image data;
   an edge vicinity pixel detector that detects pixels in the vicinity of an edge of the document based on luminance values of the image data generated by the reader;
   a histogram creating portion that creates a histogram using luminance values of pixels in a region of the document within a predetermined distance from the pixels in the vicinity of the edge and excluding the pixels in the vicinity of the edge;
   a determination portion that determines whether or not it is possible to separate a document region from a document-external region based on the created histogram; and
   a selector that selects, based on a result of determination performed by the determination portion, one of a rectangular elimination method, in which a region within a smallest possible rectangle that surrounds the document is taken as the document region and a region other than the document region is taken as the document-external region and eliminated, and an angular elimination method, in which a shape of the document itself is taken as the document region and a region other than the document region is taken as the document-external region and eliminated.

2. The image processing apparatus according to claim 1, wherein the region is a region that does not include pixels in an edge that is a border between the document region and the document-external region.

3. The image processing apparatus according to claim 1, wherein the edge vicinity pixel detector detects, on a line-by-line basis, regions in which pixels having luminance values greater than or equal to a pre-set threshold continue for greater than or equal to a predetermined number of pixels,
   detects, when a single region has been detected, one or more pixels on either side of the single region as the pixels in the vicinity of the edge, and
   detects, when plural regions have been detected, one or more pixels, from among pixels included in the plural regions, that are located in outermost positions of the plural regions as the pixels in the vicinity of the edge.

4. The image processing apparatus according to claim 1, wherein the determination portion determines whether or not it is possible to separate the document region from the document-external region based on a proportion of the number of pixels in a predetermined low-luminance region in the histogram to an overall number of pixels in the histogram.

5. The image processing apparatus according to claim 1, wherein the determination portion determines whether or not it is possible to separate the document region from the document-external region based on a comparison between the number of pixels in a predetermined low-luminance region and a pre-set first selection threshold.

6. The image processing apparatus according to claim 1, wherein the determination portion determines whether or not it is possible to separate the document region from the document-external region based on a comparison between a peak luminance value in the histogram and a pre-set second selection threshold.

7. An image processing method, comprising:
   reading a document and generating image data;
   detecting pixels in the vicinity of an edge of the document based on luminance values of the generated image data;
   creating a histogram using luminance values of pixels in a region of the document within a predetermined distance from the pixels in the vicinity of the edge and excluding the pixels in the vicinity of the edge;
   determining whether or not it is possible to separate a document region from a document-external region based on the created histogram; and
   selecting, based on a result of the determining, one of a rectangular elimination method, in which a region within a smallest possible rectangle that surrounds the document is taken as the document region and a region other than the document region is taken as the document-external region and eliminated, and an angular elimination method, in which a shape of the document itself is taken as the document region and a region other than the document region is taken as the document-external region and eliminated.

8. The image processing method according to claim 7, wherein the region is a region that does not include pixels in an edge that is a border between the document region and the document-external region.

9. The image processing method according to claim 7, wherein the detecting includes
detecting, on a line-by-line basis, regions in which pixels having luminance values greater than or equal to a preset threshold continue for greater than or equal to a predetermined number of pixels,
detecting, when a single region has been detected, one or more pixels on either side of the single region as the pixels in the vicinity of the edge, and
detecting, when plural regions have been detected, one or more pixels, from among pixels included in the plural regions, that are located in outermost positions of the plural regions are detected as the pixels in the vicinity of the edge.

10. The image processing method according to claim 7, wherein the determining includes determining whether or not it is possible to separate the document region from the document-external region based on a proportion of the number of pixels in a predetermined low-luminance region in the histogram to an overall number of pixels in the histogram.

11. The image processing method according to claim 7, wherein the determining includes determining whether or not it is possible to separate the document region from the document-external region based on a comparison between the number of pixels in a predetermined low-luminance region and a pre-set first selection threshold.

12. The image processing method according to claim 7, wherein the determining includes determining whether or not it is possible to separate the document region from the document-external region based on a comparison between a peak luminance value in the histogram and a pre-set second selection threshold.

13. A non-transitory computer-readable recording medium having stored thereon a program that causes a computer to execute the steps of:
reading a document and generating image data;
detecting pixels in the vicinity of an edge of the document based on luminance values of the generated image data;
creating a histogram using luminance values of pixels in a region of the document within a predetermined distance from the pixels in the vicinity of the edge and excluding the pixels in the vicinity of the edge;
determining whether or not it is possible to separate a document region from a document-external region based on the created histogram; and
selecting, based on a result of the determining, one of a rectangular elimination method, in which a region within a smallest possible rectangle that surrounds the document is taken as the document region and a region other than the document region is taken as the document-external region and eliminated, and an angular elimination method, in which a shape of the document itself is taken as the document region and a region other than the document region is taken as the document-external region and eliminated.

14. The non-transitory computer-readable recording medium according to claim 13, wherein the region is a region that does not include pixels in an edge that is a border between the document region and the document-external region.

15. The non-transitory computer-readable recording medium according to claim 13, wherein the detecting includes
detecting, on a line-by-line basis, regions in which pixels having luminance values greater than or equal to a preset threshold continue for greater than or equal to a predetermined number of pixels,
detecting, when a single region has been detected, one or more pixels on either side of the single region as the pixels in the vicinity of the edge, and
detecting, when plural regions have been detected, one or more pixels, from among pixels included in the plural regions, that are located in outermost positions of the plural regions are detected as the pixels in the vicinity of the edge.

16. The non-transitory computer-readable recording medium according to claim 13, wherein the determining includes determining whether or not it is possible to separate the document region from the document-external region based on a proportion of the number of pixels in a predetermined low-luminance region in the histogram to an overall number of pixels in the histogram.

17. The non-transitory computer-readable recording medium according to claim 13, wherein the determining includes determining whether or not it is possible to separate the document region from the document-external region based on a comparison between the number of pixels in a predetermined low-luminance region and a pre-set first selection threshold.

18. The non-transitory computer-readable recording medium according to claim 13, wherein the determining includes determining whether or not it is possible to separate the document region from the document-external region based on a comparison between a peak luminance value in the histogram and a pre-set second selection threshold.

* * * * *